United States Patent [19]
Carter

[11] 3,711,149
[45] Jan. 16, 1973

[54] VEHICLE SEAT

[75] Inventor: John W. Carter, Alexandria, Va.

[73] Assignee: Seats, Inc., Reedsburg, Wis.

[22] Filed: July 22, 1970

[21] Appl. No.: 57,187

[52] U.S. Cl. ............... 296/63, 248/399, 297/307, 297/316
[51] Int. Cl. ............................................... B60n 1/00
[58] Field of Search...296/63, 64, 65 R, 35; 297/316, 297/307, 309, 300; 248/376, 385, 387, 399

[56] References Cited

UNITED STATES PATENTS

| 3,567,279 | 3/1971 | Hall et al. | 297/309 |
| 3,504,881 | 4/1970 | Pillons et al. | 297/307 X |
| 2,620,855 | 12/1952 | Stone | 248/399 X |
| 2,958,542 | 11/1960 | Janeway | 280/438 R |
| 3,203,712 | 8/1965 | Lorrin | 280/438 R |
| 3,356,413 | 12/1967 | Radke et al. | 297/300 |
| 3,010,757 | 11/1961 | De Haan | 296/35 R |

FOREIGN PATENTS OR APPLICATIONS

| 1,430,629 | 10/1968 | Germany | 296/65 R |
| 1,180,661 | 2/1970 | Great Britain | 296/65 R |

Primary Examiner—Benjamin Hersh
Assistant Examiner—John A. Pekar
Attorney—Molinare, Allegretti, Newitt & Witcoff

[57] ABSTRACT

The disclosed seat is adapted to be utilized with vehicles having their "pitch axes" located either in front of or behind the seat. The seat includes a four-bar linkage assembly which supports the seat and which is arranged so that each of the lines of action of each of the links of the four-bar assembly intersect substantially adjacent to the transverse pitch axis of the vehicle. This arrangement of the lines of action of the links of the four-bar linkage assembly substantially minimizes the "back-slapping" action from the seat during operation of the vehicle.

In some of the disclosed embodiments, the bottom cushion pan of the seat forms a part of the four-bar linkage assembly. Also, in some embodiments, the bottom cushion and the back cushion are pivotally interconnected and the bottom cushion is arranged so as to pivot about a point adjacent to and slightly above its upper, front edge. This arrangement permits the bottom cushion to move, in the fore-aft direction, in synchonism with and the same amount as the back cushion and thus provides an even more comfortable ride.

22 Claims, 8 Drawing Figures

PATENTED JAN 16 1973　　　　　　　　　3,711,149

Inventor:
John W. Carter
By Molinare, Allegretti
Newitt + Witcoff
Attys.

PATENTED JAN 16 1973

Inventor:
John W. Carter
By Molinare, Allegretti,
Newitt & Witcoff
Attys.

VEHICLE SEAT

BACKGROUND OF THE INVENTION

The present invention relates to an improved seat for vehicles which are subject to vibrations during operation, and more specifically, to an improved seat for use with vehicles, such as tractor-trailer highway trucks, which have their pitch axes located behind the seat, and with vehicles, such as bulldozers and front-end loaders, which have their pitch axes located in front of the seat.

In the past, studies have been made relating to the problems with the quality of ride problem provided by vehicles. One of the frequent driver objections to the quality of ride obtained from the prior seats used in vehicles, such as tractor-trailer trucks, is often described in terms of a "back-slapping" action from the seat. This "back-slapping" action may be better described if, for example, the tractor chassis is likened to a teeter-totter board, which oscillates or pivots about a pivot axis which, in the tractor is its "pitch axis." The elevated seat position of the driver in the tractor may be simulated by a chair attached to and sitting on one end of the teeter-totter board. The weight of the trailer carried by the tractor is like a much heavier companion on the other end of the teeter-totter board. If springs are secured between the ends of the teeter-totter board and the ground, then the board, like the tractor chassis, will perform a series of oscillations once it is displaced from its neutral position.

The tractor driver, like a person sitting in the chair on the end of the teeter-totter board, is subjected to fore-aft motion at the same time as he moves vertically. It is the fore-aft movement that causes "back-slapping" action from the seat.

The improved seat of the present invention utilizes a novel and unique linkage assembly which minimizes the objectionable "back-slapping" action from a vehicle seat. More specifically, the improved vehicle seat of the present invention uses a four-bar linkage assembly which supports the bottom and back cushions of the seat and which includes first and second, generally horizontally disposed pairs or sets of links. The first pair of links are pivotally connected at their one ends to a vertical portion of the seat support. The second pair of links are positioned above the first pair of links and are pivoted, at their one ends, about points which are located in the plane of the vertical portion of the seat support. A third pair of links are pivotally connected at their one ends to the other ends of the first pair of links and are pivotally connected, intermediate their ends, to the other end of the second pair of links. The links of the first and second pairs of links are arranged so that the "lines of action" of all these links intersect substantially adjacent to the pitch axis of the vehicle. This arrangement of the lines of action of the links minimizes the "back-slapping" action of the seat.

In several embodiments of the improved seat of the present invention, the bottom cushion and the back cushion are pivotally interconnected and the bottom cushion pan constitutes the second pair of links. In some embodiments of the improved seat of the present invention, the points about which the one ends of the second pair of links pivot are located adjacent to and slightly above the upper, front edge of the bottom cushion of the seat. This permits the bottom cushion to move in the fore-aft direction in synchronism with and the same amount as the back cushion thereby providing an even more comfortable ride. In other embodiments, the one ends of the second pair of links are pivotally connected to the vertical portion of the seat support.

The improved seat of the present invention has the advantage that it may be utilized both with vehicles which have their pitch axes located behind the seat and with vehicles which have their pitch axes located in front of the seat. Another advantage, from the standpoint of the commercialization of the seat, is that the improved seat of the present invention may be manufactured and assembled relatively inexpensively and does not require a large amount of vertical space in the cab of the tractor.

Accordingly, it is a primary object of the present invention to provide an improved seat usable with vehicles which have their pitch axes located either behind or in front of the seat and which are subject to vibrations during operation. A related object of the present invention is to provide an improved vehicle seat of the type described which may be relatively inexpensively manufactured and assembled and which does not require a large amount of vertical space in the cab of the tractor.

Another object of the present invention is to provide an improved vehicle seat of the type described which includes a novel four-bar linkage assembly wherein the lines of action of the links of the four-bar linkage assembly intersect substantially adjacent to the pitch axis of the vehicle in which the seat is utilized.

Still another object of the present invention is to provide an improved vehicle seat of the type described wherein the bottom cushion pan forms a part of the four-bar linkage assembly and wherein the four-bar linkage assembly is arranged so as to permit the bottom cushion to move in the fore-aft direction in synchronism and in the same amount as the back cushion.

These and other objects and features of the present invention will become apparent from the description of the following embodiments of the improved seat of the present invention.

BRIEF DESCRIPTION OF THE DRAWINGS

Referring to the drawings, wherein like reference numerals indicate like parts throughout the eight figures.

DESCRIPTION OF THE PREFERRED EMBODIMENT

Figure 1:
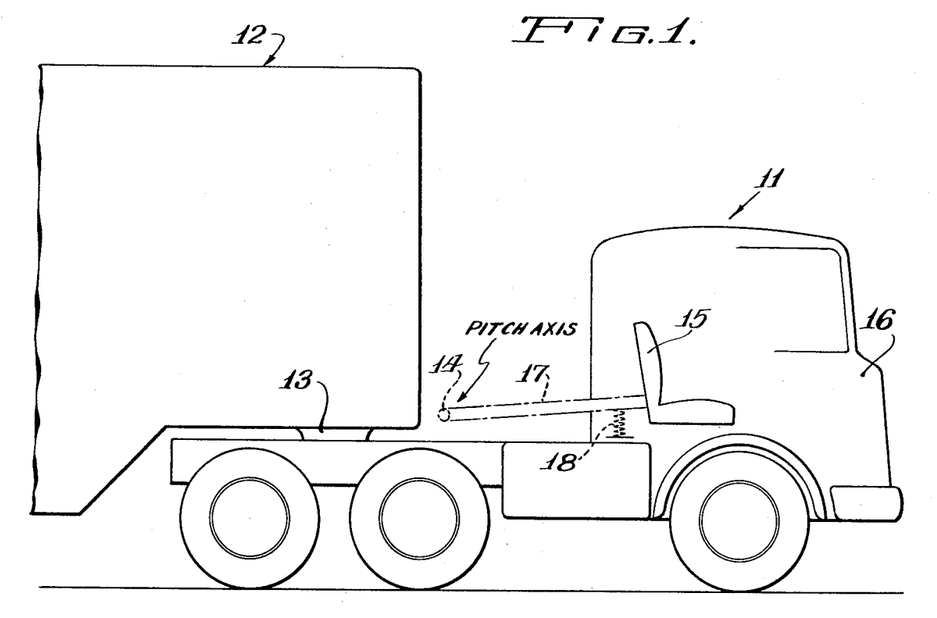
FIG. 1 is a plan view of a tractor-trailer vehicle and illustrates the underlying concept of the improved seat of the present invention.

As noted above, FIG. 1 illustrates the underlying concept of the improved seat of the present invention, and more particularly, shows a tractor 11 attached to a trailer 12 by means of a kingpin 13 in a conventional manner. The pitch axis of the tractor 11 is shown at 14 and represents the transverse axis about which the tractor 11 and the parts thereof will tend to "pitch" during operation of the tractor-trailer. In other words, the pitch axis 14 is the transverse axis about which the tractor 11 oscillates as a result of the vibrations impressed upon it by the road conditions and by the trailer 12 during operation.

A seat 15 is disposed in the cab 16 of the tractor 11. Ideally, if the seat 15 could be supported on one end of a lever arm, such as shown at 17, which has its other end attached to the pitch axis 14 by means of a "zero" friction bearing, and which is biased upwardly by a relatively "soft," low rate spring, such as shown at 18, with a natural frequency significantly less than the tractor pitching frequency in order to "isolate" the seat 15, then the pitching or oscillations of the tractor 11 would not cause any fore-aft or pitching motion of the seat 15 during operation of the tractor-trailer, and there would be no "back-slapping" problem. However, as is apparent, the use of a lever arm, such as arm 17, to support the seat 15 is not practical. Nevertheless, the underlying concept, illustrated in FIG. 1, i.e., arranging the seat so that it tends to pivot about the pitch axis of the tractor, has been utilized in the improved seats of the present invention as hereinafter more specifically described.

Figure 2:
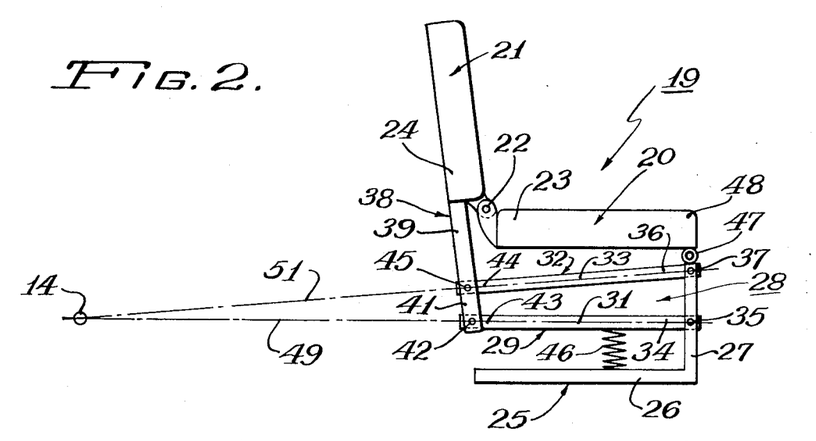
FIGS. 2, 3, 4, 5 and 6 are partial, side plan views, generally schematical, of vehicle seats embodying the present invention.

FIG. 2 Embodiment.

In FIG. 2, an improved seat 19 of the present invention includes a bottom cushion 20 and a back cushion 21. A pair of conventional hinges 22 are utilized to pivotally interconnect the rear end 23 of the bottom cushion 20 and the bottom end 24 of the back cushion 21, with one of the hinges 22 being located adjacent to one side of the cushions and the other hinge 22 being located adjacent to the other side of the cushions.

Seat 19 includes a support or frame 25 which comprises a base portion 26 and a vertical wall portion 27. The vertical wall portion 27 is positioned adjacent to the front of the seat 19, and the base portion 26 is adapted to be securely mounted on a vehicle, such as the tractor 11, which is normally subjected to vibrations during operation.

A novel four-bar linkage assembly, shown generally at 28, is utilized to support the seat 19 as hereinafter described. The linkage assembly 28 includes a first pair or set of links 29, with one of these links being shown at 31, and a second set or pair of links 32, with one of these links being shown at 33. Since both of the links which comprise the first set of links 29 are structurally and functionally identical, only link 31 will be described in detail. Likewise, since both of the links of the second pair of links 32 are structurally and functionally identical, only link 33 will be described in detail. The links comprising the first and second pairs of links 29 and 32 are disposed adjacent to and below the sides of the cushions 20 and 21.

The front end 34 of the link 31 is pivotally connected, at a point 35, to the vertical wall portion 27 so as to permit the link 41 to pivot vertically about the point 35.

The second pair of links 32 are positioned above the first pair of links 29 and the front end 36 of the link 33 is pivotally connected to the vertical wall portion 27, at a point 37, which is spaced from and above the point 35. Like link 31, link 33 may pivot vertically about the point 37.

A third pair or set of links 38, with one of these links being shown at 39, are utilized to interconnect the rear ends of the first and second pairs of links 29 and 32. Again since both of the links in the third pair of links 38 are structurally and functionally identical, only link 39 will be described in detail. The lower end 41 of the link 39 is pivotally connected, at a point 42, with the rear end 43 of the link 31. The rear end 44 of the link 33 is pivotally connected to the link 39, at a point 45, intermediate the ends of the link 39. The rear ends of the other links of the first and second pairs of links 29 and 32 are, as noted above, similarly interconnected by the other link of the third pair of links 38. The upper ends of the third pair of links 38 carry and support the back cushion 21.

A biasing means 46, shown as a conventional coil compression spring, is mounted on the base portion 26 of the support 25 and is utilized to bias the first pair of links 29 and thus the linkage assembly 28, away from the base portion 26 of the support 25. A flexible rubber hose 47 is mounted on the upper end of the vertical wall portion 27. The front end 48 of the bottom cushion 20 rests on the hose 47 so that the hose 47 provides a roller support for the front end of the cushion 20 thereby permitting limited, supported, relative movement between the wall portion 27 and the bottom cushion 20.

As shown in FIG. 2, the distance between the points of pivotal connection, such as points 35 and 37, of the front ends of the first and second pairs of links 29 and 32 is greater than the distance between the points of pivotal connection, such as points 42 and 45, of the rear ends of the links of the first and second pairs of links 29 and 32. These distances between the front ends and between the rear ends of the pairs of links 29 and 32 are selected and the links of the first and second pairs of links 29 and 32 are arranged so that their "lines of action" intersect substantially adjacent to the pitch axis 14 of the vehicle in which the seat 19 is utilized. In this context, the line of action of the link 31 is defined as an imaginary line including the points 35 and 42 and the line of action of the link 33 is defined as an imaginary line including the points 37 and 45. The lines of action of the links 31 and 33 are shown by the phantom lines 49 and 51, respectively, in FIG. 2. The intersection of the lines of action of the first and second pairs of links 29 and 32 substantially adjacent to the pitch axis 14 causes the seat 19 to tend to pivot about the transverse pitch axis 14, and thus substantially minimizes the "back-slapping" action from the seat 19.

Figure 3:
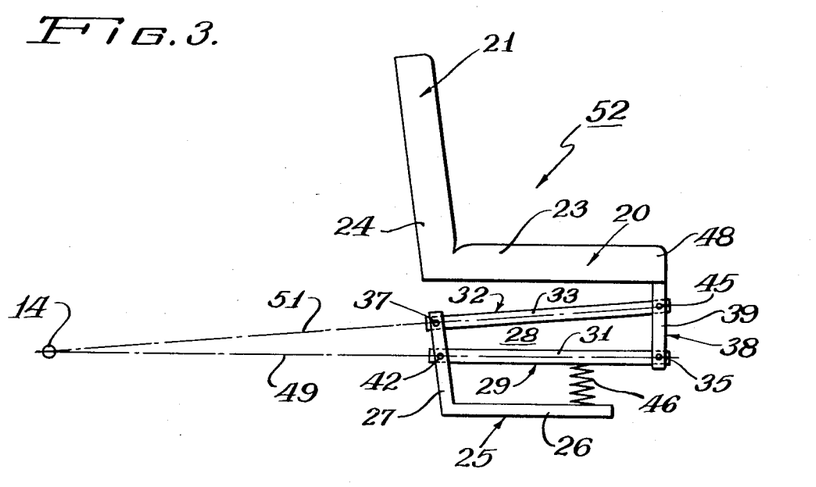

FIG. 3 Embodiment.

The improved seat 52 is substantially identical to the seat 19 except that the vertical wall portion 27 is located adjacent to the rear of the seat 52 and except that the upper ends of the third pair of links 38 are secured to and support the front end 48 of the bottom cushion 20 rather than the back cushion 21. Also, the cushions 20 and 21 are secured together in a fixed, rather than a pivotal, relationship at their rear and lower ends 23 and 34, respectively. Again, like in seat 19, the lines of action 49 and 51 of the first and second pairs of links 29 and 32 of the linkage assembly 28 intersect substantially adjacent to the pitch axis 14 of the vehicle in which the seat 52 is mounted.

Figure 4:
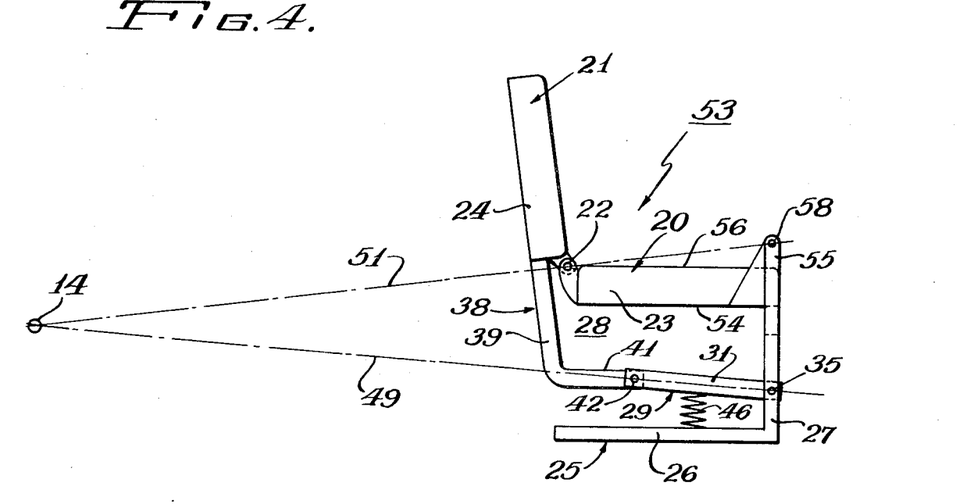

FIG. 4 Embodiment.

The improved seat 53 is structurally and functionally similar to seat 19 except in seat 53, a bottom cushion pan 54, which supports and carries the bottom cushion 20, constitutes the second pair or set of links 32. In other words, the bottom cushion pan 54 forms a part of the four-bar linkage assembly 28.

In the seat 53, the vertical wall portion 27 has an upper, bifurcated end 55 which extends upwardly from the base portion 26 and is arranged so that each of the bifurcated ends 55 are positioned above the outer (body contacting) surface 56 of the cushion 20, with one of the bifurcated ends being positioned adjacent to one side of cushion 20 and with the other bifurcated end being positioned adjacent to the other side of the cushion 20. A pair of generally triangular flanges 57 are secured to the front end of the bottom cushion pan 54, with one of the flanges 57 being secured adjacent to one side of the pan 54 and with the other flange 57 being secured adjacent to the other side of the pan 54. Each of the flanges 57 extend upwardly from the bottom cushion pan 54 so that its upper end is adjacent to an end of the bifurcated ends 55 of the vertical wall portion 27. Each of the flanges 57 is pivotally connected, such as shown at point 58, with the adjacent end of the bifurcated ends 55 of the wall portion 27. The advantage of positioning the pivot point 58 slightly above and adjacent to the upper front end of the bottom cushion 20 is that this arrangement permits the cushion 20 to move in fore-aft synchronism with and in the same amount as the back cushion 21 during operation of the seat, thereby providing an even more comfortable ride for the occupant of the seat 53.

Another structural difference between the seat 19 and the seat 53 is that in the seat 53, the links of the third pair of links 38 are curved so that their lower ends are generally horizontally disposed. As a result of this arrangement, the lengths of the first pair of links 29 are less than the lengths of the second set of links, i.e., the distance between the pivot point 58 and the hinge 22 so that a change (decrease) in the included angle between the bottom cushion 20 and the back cushion 21, as the bottom cushion 20 moves downwardly, is relatively minimized thereby reducing "pitching" of the occupant of the seat during downward vertical movement of the seat about pivot point 58. Also as a result of this arrangement, the upper, front edge of the bottom cushion 20 of the seat remains relatively stationary during operation of the vehicle and vertical movement of the remainder of the seat does not tend to lift the operator's feet off the foot pedals of the vehicle.

In seat 53, as in the seat 19, the lines of action of the links of the first and second set of links, such as lines 49 and 51, intersect substantially adjacent to the pitch axis 14 of the vehicle in which the seat is used. However, in seat 53, the line of action 51 is defined by an imaginary line which includes the pivot point 58 and the hinge 22.

Figure 5:
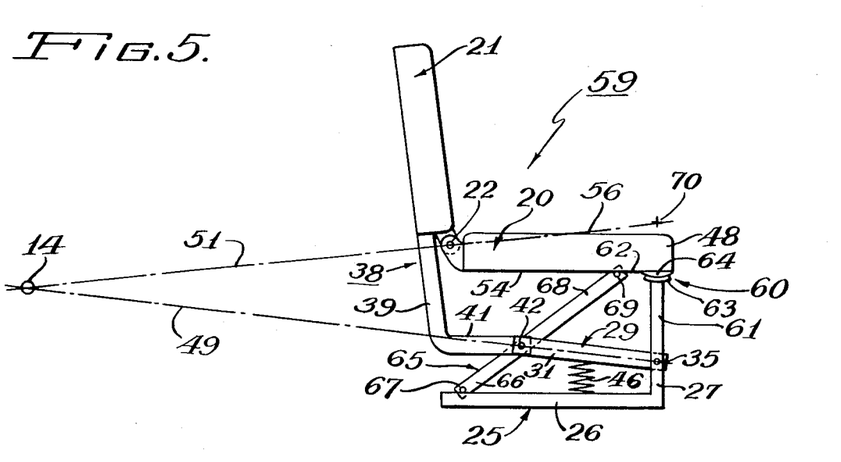

FIG. 5 Embodiment.

The improved seat 59 shown in FIG. 5 is structurally and functionally similar to seat 53 except that the front end 48 of the bottom cushion 20 is supported in a different manner. A bearing 60, formed on the upper end 61 of the vertical wall portion 27, supports the front end 62 of the bottom cushion pan 54. More specifically, an arcuate surface 63 is formed on the upper end 61 of the wall portion 27 and a matching, complementary curved, arcuate surface 64 is formed on the front end 62 of the pan 54. The bearing 60 permits pivotal, relative movement between the wall portion 27 and the pan 54 and, as noted, also provides vertical support for the front end 48 of the cushion 20. The arcuate surfaces 63 and 64 of the bearing 60 have a sufficient radius of curvature so as to prevent the surface 64 from moving, in fore-aft direction, out of engagement with the surface 63.

A diagonal link 65 is disposed midway between the links forming the first pair of links 29 and has its lower end 66 pivotally connected, at a point 67, to the base portion 26. The upper end 68 of the link 65 is pivotally connected, at a point 69, with the underside of this bottom cushion pan 54, adjacent to the front end 62 of the pan 54. The pivot point 70, i.e., the point about which the cushion 20 and thus the seat 59 may vertically move, is defined by the point of intersection of the radius of curvature of the arcuate surface 64 and a diagonal plane including the line of action of the link 65. In seat 59, the line of action of link 65 is defined as a line including pivot points 67 and 69. As shown in FIG. 5, the pivot points 70 are located adjacent to the upper front end 48 of the cushion 20 generally slightly above the plane of the outer (body engaging) surface 56 of the cushion 20. As in seat 53, this arrangement permits the bottom cushion 20 to be able to move in fore-aft synchronism with and the same amount as the back cushion 21 during the operation of the vehicle in which the seat 59 is utilized, thereby providing an even more comfortable ride for the occupant of the seat.

Figure 6:
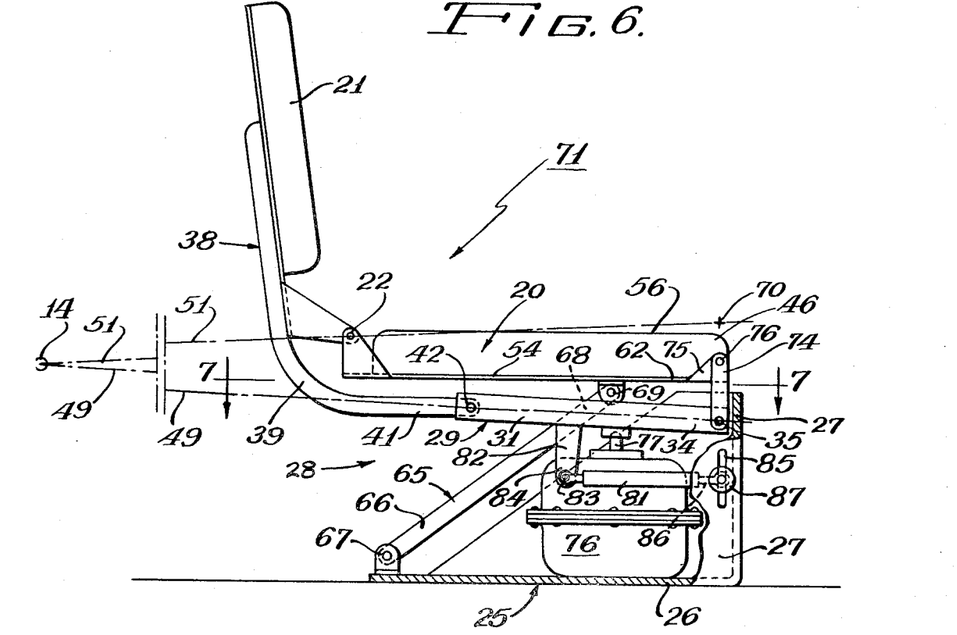

FIG. 6 Embodiment.

The improved seat 71 is structurally and functionally quite similar to the seat 59 except that the front end 48 of the bottom cushion 20 is supported in a different manner. More specifically, in seat 71, the front ends 34 and 62 of the first pair of links 29 are pivotally connected with the vertical wall portion 27 by means of a rod 72 which extends transversely across and under the seat 71. A pair of relatively small links 73 and 74 are pivotally connected, at their one ends, to and mounted on the rod 72 with link 73 being positioned adjacent to one end of the rod 72 and with the link 74 being positioned adjacent to the other, opposite end of the rod. A pair of relatively small, generally triangular flanges 75 are secured to the front end 62 of the pan 54, with one of the flanges being secured adjacent to one side of the pan 54 and with the other flange being secured adjacent to the other side of the pan 54. The flanges are pivotally interconnected to the other ends of the links 73 and 74, as shown at a point 76.

Figure 7:
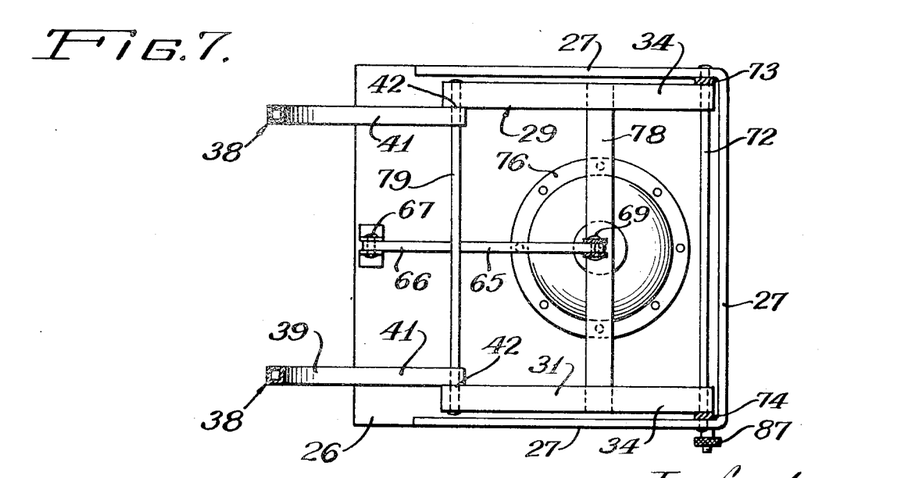
FIG. 7 is a cross-sectional view taken on line 7—7 in FIG. 6.

In a manner similar to rod 72, a rod 79 is used to pivotally connect the rear ends of the first pair of links 29 to the lower ends of the third pair of links 38. The rod 79, as shown in FIG. 7, extends horizontally beneath the bottom cushion pan 54, but unlike rod 72, is not connected to the wall portion 27.

In seat 71, and as shown in FIG. 6, the point 70, i.e., the point about which the bottom cushion 20 pivots vertically, is defined by the intersections of the line of action of the link 74 with a diagonal plane including the diagonal link 65. [Of course, as in the other embodiments of the improved seat of the present invention described herein, the bottom cushion 20 in seat 71 does not actually pivot vertically about a point 70, but rather obviously pivots about a line or axis which is perpendicular to a plane perpendicular to the ground. The term "point" has been utilized herein for convenience of description since the seats 19, 52, 53 and 59 are shown only in a side plan view.]

Another structural difference between the seat 71 and the seat 59 is that a conventional air spring 76 is used instead of a conventional coil compression spring. The upper projecting, vertically movable end 77 of the spring 76 engages the underside of a transverse link 78 which is secured to and between the first pair of links 29. The end 77 of the spring 76 is arranged so that it exerts upward biasing force on the first pair of links 29 at a point approximately four-tenths of the distance between the pivot point 35 and the pivot point 42. In other words, the spring 76 exerts force on the first pair of links 29 at a point closer to the pivot point 35 than the pivot point 42. This arrangement enables the spring 76 to be used without an additional reservoir although, of course, the spring 76 could include a conventional air inlet-outlet valve and if desired could utilize an additional reservoir.

A further structural difference between the seat 71 and the seat 59 is that a conventional shock absorber 81 is utilized with the seat 71 to dampen oscillatory motion of the seat. (Of course, a similar shock absorber may also be used with the other seats described herein). A flange 82 is secured to the underside of the link 31 and extends downwardly therefrom. The rear end 83 of the shock absorber 81 is pivotally connected to the lower end 84 of the flange 82. A longitudinal slot 85 is formed in the wall portion 27 of the base support 26 so that the longitudinal axis of the slot is generally vertical. The front end 86 of the shock absorber 81 is disposed within the slot 85 so that it may be moved along the slot 85 by the occupant of the seat. A locking knob 87 is carried by the end 86 of the shock absorber 81 and is utilized to selectively prevent the end 86 from moving relative to the slot 85 when the knob 87 is tightened. In other words, the knob 87 is utilized to hold the end 86 of the shock absorber 81 in a particular location within the slot 85 which the occupant has selected. By moving the end 86 of the shock absorber 81 with respect to the slot 85, the occupant is able to change or vary the angle of the shock absorber with respect to the flange 82 and thus vary or change the mechanical advantage of the shock absorber. In other words, the damping force exerted by the shock absorber 81, on the link 31 and thus on the linkage 28 may be changed or varied by the occupant moving the end 86 of the shock absorber 81 within the slot 85. The shock absorber 81 may be of the type which can be internally adjusted by the occupant so as to increase or decrease the resistance of the shock absorber. This, of course, permits the operator to have a wider "selection" or control over the suspension damping action of the seat. This has proven to be psychologically advantageous in that the occupant then feels he has a definite control over the quality of the ride.

Again, as in seat 59, the lines of action 49 and 51 intersect substantially adjacent to the pitch axis 14 of the vehicle in which the seat 71 is utilized.

Another advantage of the seat 71 is that it may be made relatively compactly and that the distance between the outer (body engaging) surface 56 of cushion 20 and the base support 26 may be relatively small since the second pair of links are a part of the bottom cushion pan 54.

Figure 8:
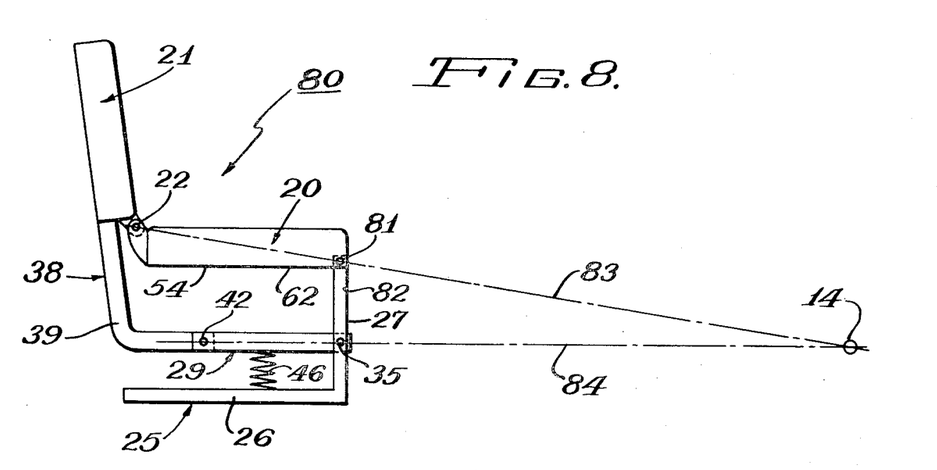
FIG. 8 is a partial, side view of a further vehicle seat embodying the present invention.

FIG. 8 Embodiment.

The improved seat 88 is structurally and functionally similar to the seat 53 except that seat 88 is arranged so as to be used with a vehicle having its pitch axis 14 located in front of the seat 88. In seat 88, one side of the front end 62 of the bottom cushion pan 54 is pivotally connected, at a point 89, to one side of the upper end 91 of the vertical wall portion 27. The other side of the front end 62 is likewise pivotally connected to the other side of the upper end 91 of the wall portion 27. The seat 88 is arranged such that vertical distance between the hinge 22 and the pivot point 42 is greater than the distance between the pivot points 35 and 89. This arrangement permits the lines of action 92 and 93 to intersect in front of the seat 88 substantially adjacent to the pitch axis 14. In seat 88, the line of action 92 is an imaginary line which includes the hinge 22 and the point 89, and the line of action 93 is an imaginary line which includes the pivot points 35 and 42.

Conclusion.

In view of the foregoing, it is apparent that the invention described herein permits an improved vehicle seat to be designed which will substantially minimize the objectionable "back-slapping" action of the seat during operation of the vehicle. Furthermore, in certain embodiments described herein, the bottom cushion 20 is pivoted at a point slightly above and adjacent to its upper front edge and arranged so that the bottom cushion 20 moves in synchronism with and in the same amount, in a fore and aft direction, as the back cushion 21. This arrangement provides an even more comfortable ride for the occupant of the seat.

In view of the various embodiments described hereinabove, it should be apparent to those skilled in this art that the present invention may be embodied in forms other than those specifically described herein without departing from the spirit or central characteristics of the invention. Thus the specific embodiments described above are to be considered in all respects as illustrative and not restrictive, the scope of the invention being indicated by the appended claims rather than by the foregoing descriptions, and all changes that come within the meaning and range of equivalency of the claims are, therefore, intended to be embraced therein.

I claim:

1. An improved seat for vehicles wherein the "pitch axis" of the vehicle is spaced from the seat and wherein the seat tends to be pivoted about the pitch axis during operation of the vehicle, the improved seat comprising:

a seat support adapted to be securely mounted on the vehicle and having a base portion and a vertical portion substantially perpendicular to the base portion;

a four-bar linkage assembly means for supporting the seat, the four-bar linkage assembly means including:

a first set of links, including first and second, substantially identical links, with first link having one end pivotally connected to the vertical portion of the seat support at a first point spaced from the base portion of the seat support a first pre-selected distance and with the second link having one end pivotally connected to the vertical portion of the seat support at a second point also spaced from the base portion of the seat portion a distance equal to said first pre-selected distance and spaced from said first point;

a second set of links including third and fourth, substantially identical links with the plane of the third and fourth links being above the plane of the first and second links, with the third link having one end adapted to be pivoted about a third point which is located substantially in the plane of the vertical portion of the base support and which is spaced from the base portion of the seat support a second pre-selected distance that is greater than said first pre-selected distance, and with the fourth link having one end adapted to be pivoted about a fourth point which is located substantially in the plane of the vertical portion of the seat support, which is also spaced from the base portion of the seat support a distance equal to said second pre-selected distance and which is spaced from the third point;

a third set of links including fifth and sixth links, with the fifth link having one end pivotally connected to the other end of the first link at a fifth point and being pivotally connected, intermediate its ends, to the other end of the third link at a sixth point which is spaced from the fifth point a third pre-selected distance and with the sixth link having one end pivotally connected to the other end of the second link at a seventh point and being pivotally connected, intermediate its ends, to the other end of the fourth link at an eighth point which is spaced from the seventh point a distance equal to said third pre-selected distance;

a bottom cushion positioned above the plane of the first set of links and supported by the four-bar linkage assembly means;

a back cushion disposed at an angle with respect to the plane of the bottom cushion;

said first, second and third pre-selected distances being selected so that the first, second, third and fourth links are arranged relative to each other and relative to the seat support so that the lines of action of the first, second, third and fourth links intersect substantially adjacent to the pitch axis of the vehicle so that the seat pivotally moves about the pitch axis thereby minimizing the "back-slapping" action from the seat; and means for biasing the four-bar linkage assembly means away from the base portion of the seat support.

2. The improved seat described in claim 1 wherein said pitch axis is located behind the seat.

3. The improved seat described in claim 1 wherein said pitch axis is located in front of said seat.

4. The improved seat described in claim 1 which includes a bottom cushion pan that is utilized to support and carry the bottom cushion of the seat; and, wherein the second set of links forms a part of the bottom cushion pan.

5. The improved seat described in claim 4 wherein the bottom cushion of the seat has an upper front edge which is normally adjacent to the knees of a person seated in the seat; and, wherein the third and fourth pivot points are located adjacent to the upper front edge of the bottom cushion so that the bottom cushion may move in the fore-aft direction in synchronism with and the same amount as the back cushion.

6. The improved seat described in claim 5 which includes seventh and eighth substantially identical links that are pivotally connected at their one end with the first and second pivot points respectively and are pivotally connected at their other end with the bottom cushion pan adjacent its forward front end.

7. The improved seat described in claim 6 which includes a ninth link that is pivotally connected at one end with the base portion of the seat support and that is pivotally connected at its other end with the bottom cushion pan adjacent to the first front end of the bottom cushion pan; and wherein the ninth link forms an acute angle with the planes of the first set of links.

8. The improved seat described in claim 5 wherein the upper end of the vertical portion of the seat support is disposed below the front end of the bottom cushion pan; wherein the upper end of the vertical portion of the seat support includes a first bearing surface; and wherein the front end of the bottom cushion pan has a second bearing surface formed thereon adjacent to the first bearing surface and arranged so that the second bearing surface engages and cooperates with the first bearing surface.

9. The improved seat described in claim 8 which includes a ninth link that is pivotally connected at one end with the base portion of the seat support and is pivotally connected at its other end with the bottom cushion pan adjacent to the first front end of the bottom cushion pan; and wherein the plane of the ninth link forms an acute angle with the planes of the first set of links.

10. The improved seat described in claim 5 wherein a line including the first and fifth pivot points, a line including the second and seventh pivot points, a line including the third and sixth pivot points, and a line including the fourth and eighth pivot points define the lines of action of the first, second, third and fourth links, respectively.

11. The improved seat described in claim 4 wherein the third and fourth pivot points are located adjacent to the front edge of the bottom cushion pan.

12. The improved seat described in claim 4 wherein the distance between the third and sixth pivot points and the distance between the fourth and eighth pivot points are equal and are greater than the distance between the first and fifth pivot points and the distance between the second and seventh pivot points.

13. The improved seat described in claim 12 wherein the biasing means is pivotally connected to the first set of links at a point closer to the first and second pivot points than to the fifth and seventh pivot points.

14. The improved seat described in claim 1 wherein a line including the first and fifth pivot points, a line including the second and seventh pivot points, a line including the third and sixth pivot points, and a line including the fourth and eighth pivot points define the lines of action of the first, second, third and fourth links, respectively.

15. The improved seat described in claim 14 wherein the distance between the first and third pivot points and between the second and fourth pivot points is greater than the third pre-selected distance.

16. The improved seat described in claim 14 wherein the distance between the first and third pivot points and between the second and fourth pivot points is less than the third pre-selected distance.

17. The improved seat described in claim 1 wherein the back cushion is supported and carried by the other ends of the fifth and sixth links.

18. The improved seat described in claim 1 which includes a bottom cushion pan that supports and carries the bottom cushion and wherein the back cushion is secured to and carried by the rear end of the bottom cushion pan.

19. The improved seat described in claim 1 which includes a bottom cushion pan that supports and carries the bottom cushion and wherein the third and fourth pivot points are pivotally connected to the vertical portion of the seat support.

20. The improved seat described in claim 19 wherein the other ends of the fifth and sixth links are connected to the front end of the bottom cushion pan.

21. The improved seat described in claim 20 wherein the back cushion is supported and carried by the other ends of the fifth and sixth links.

22. The improved seat described in claim 19 wherein a resilient member is positioned between the lower front edge of the bottom cushion pan and the upper end of the vertical portion of the seat support so as to permit supported relative movement between the bottom cushion pan and the vertical portion of the seat support.

* * * * *